T. D. DALLMEYER.
NUT LOCK.
APPLICATION FILED APR. 11, 1913.

1,130,712.

Patented Mar. 9, 1915.

WITNESSES.
J. R. Keller
Robert C. Totten

INVENTOR.
Thomas D. Dallmeyer
By Kay & Totten
Attorneys

THE NORRIS PETERS CO., PHOTO-LITHO., WASHINGTON, D. C.

UNITED STATES PATENT OFFICE.

THOMAS D. DALLMEYER, OF OAKMONT, PENNSYLVANIA.

NUT-LOCK.

1,130,712.　　　Specification of Letters Patent.　　Patented Mar. 9, 1915.

Application filed April 11, 1913.　Serial No. 760,523.

*To all whom it may concern:*

Be it known that I, THOMAS D. DALLMEYER, a citizen of the United States, and resident of Oakmont, in the county of Allegheny and State of Pennsylvania, have invented a new and useful Improvement in Nut-Locks; and I do hereby declare the following to be a full, clear, and exact description thereof.

My invention relates to nut-locks.

The object of my invention is to provide a nut-lock in which the locking member is carried by the nut itself, and which does not in any way interfere with the applying of the nut and screwing it up on the bolt, and when put in position to lock the nut, holds it securely against turning.

Figure 1:
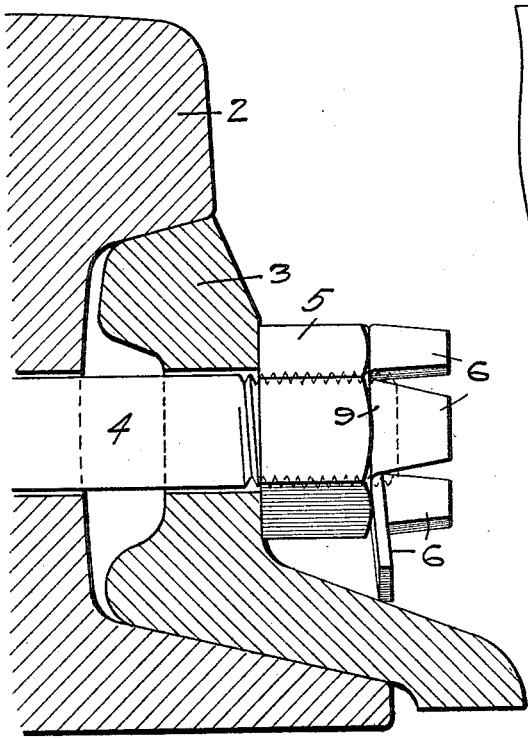
Figure 2:
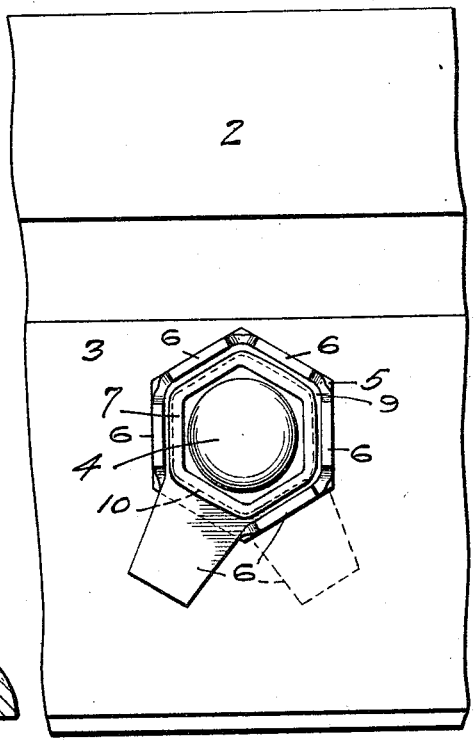
Figure 3:
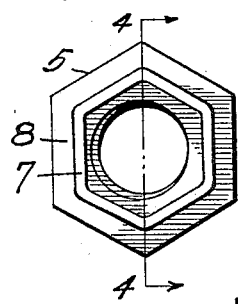
Figure 4:
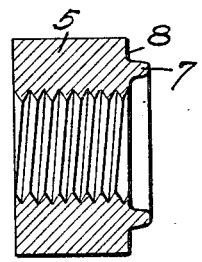
Figure 5:
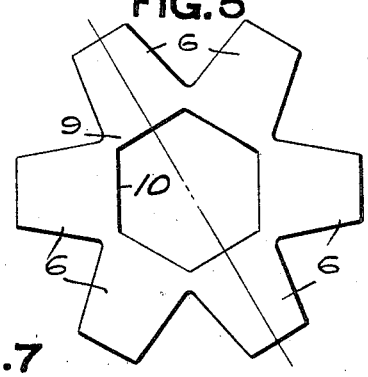
Figure 6:
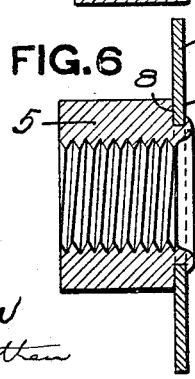
Figure 7:
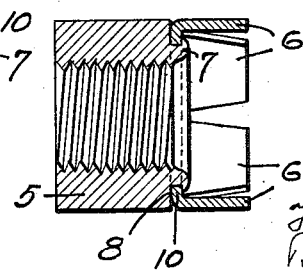

In the accompanying drawing, Figure 1 is a sectional view of a portion of a rail and fish-plate showing my nut-lock applied thereto; Fig. 2 is a face view of same; Fig. 3 is a top view of the nut before the washer is applied thereto; Fig. 4 is a section on the line 4—4 Fig. 3; Fig. 5 is a plan view of the tongued plate; Fig. 6 is a sectional view showing the plate secured to the nut, and Fig. 7 is a like view showing the tongue bent up flush with the side faces of the nut.

Referring to the drawing, the numeral 2 designates a rail of standard construction, and 3 a suitable fish-plate, the bolt 4 passing through the openings in the rail and fish-plate.

My improved nut-lock comprises the ordinary nut 5 which may be hexagonal, as shown, or of other form, threaded internally to engage the threads of the bolt 4. The nut is provided with the tongues 6 which are made of a resilient metal of suitable thickness, so that they will have the requisite strength and yet be capable of being bent for the purpose fully hereinafter set forth. These tongues may be secured to the nut 5 in any suitable manner and in the drawing I have shown one manner of securing these tongues to the nut.

The nut in course of manufacture is formed with the beading 7 at its outer end and the shoulder 8. The plate 9 is stamped out of metal of suitable thickness and resiliency, and is provided with the tongues 6. The opening 10 of the plate corresponds to the shape of the beading 7 which in the case illustrated is hexagonal in form like the nut. This plate is applied to the nut by having its opening 10 engage the beading 7 and resting against the shoulder 8. The beading 7 is then up-set or spun over to engage the plate, as illustrated in Fig. 6, so as to unite the plate securely to the nut and practically provide an integral structure. When the plate 9 has been secured to the nut in this manner, the tongues 6 are bent inwardly as indicated in Fig. 7, so as to bring the tongues flush or substantially flush with the side-faces of the nut.

In applying the nut to the bolt, the ordinary wrench is employed by which the nut is grasped in the usual manner and as the tongues 6 are flush with the sides of the nut during the turning of the nut, said tongues do not in any way interfere with the seating of the nut by the wrench. When the nut has been seated with its inner face bearing against the fish-plate, one of the tongues 6 is bent outwardly, as indicated in Figs. 1 and 2, so as to engage the fish-plate and so prevent the unscrewing of the nut. By having a series of tongues, as illustrated, there is always one in proper position for engaging the fish-plate when bent outwardly and the other tongues remain in their original position. When the nut is to be removed, it is only necessary to bend the tongue outwardly and back in position to allow for the unscrewing of the nut.

What I claim is:

1. A nut-lock comprising a nut having a beading on its outer end, a plate riveted to said nut by said beading, and a flexible tongue on said plate.

2. A nut-lock comprising a nut having a polygonal beading on its outer end, a plate having a correspondingly shaped opening engaging said beading, said beading being upset to engage said plate to secure it to said nut, and a flexible tongue on said plate.

In testimony whereof, I the said THOMAS D. DALLMEYER have hereunto set my hand.

THOMAS D. DALLMEYER.

Witnesses:
ROBERT C. TOTTEN,
JOHN F. WILL.

Copies of this patent may be obtained for five cents each, by addressing the "Commissioner of Patents, Washington, D. C."